(12) United States Patent
Fujino et al.

(10) Patent No.: US 6,621,894 B2
(45) Date of Patent: Sep. 16, 2003

(54) TELEPHONE TERMINAL AND CALLER ID UTILIZATION METHOD

(75) Inventors: Yumi Fujino, Kanagawa (JP); Shigeru Kawada, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/201,851

(22) Filed: Dec. 1, 1998

(65) Prior Publication Data

US 2001/0012347 A1 Aug. 9, 2001

(30) Foreign Application Priority Data

Dec. 15, 1997 (JP) .......................................... P09-343509

(51) Int. Cl.[7] .............................................. H04M 1/56
(52) U.S. Cl. .............................. 379/142.06; 379/142.17
(58) Field of Search .............................. 379/142, 93.17, 379/93.23, 142.06, 142.17, 88.22

(56) References Cited

U.S. PATENT DOCUMENTS

| | | | |
|---|---|---|---|
| 5,245,651 A | * | 9/1993 | Takashima et al. ...... 379/93.23 |
| 5,559,860 A | * | 9/1996 | Mizikovsky ................ 455/413 |
| 5,568,546 A | * | 10/1996 | Marutiak ................... 379/355 |
| 5,592,546 A | * | 1/1997 | Takahashi .................. 379/355 |
| 5,686,900 A | * | 11/1997 | Ono et al. ............. 340/825.44 |
| 5,748,709 A | * | 5/1998 | Sheerin ........................ 379/67 |
| 5,752,195 A | * | 5/1998 | Tsuji et al. .................. 455/462 |
| 5,907,605 A | * | 5/1999 | Ramirez et al. ............. 379/142 |
| 6,005,927 A | * | 12/1999 | Rahrer et al. ............... 379/142 |
| 6,016,341 A | * | 1/2000 | Lim ............................ 379/142 |
| 6,026,152 A | * | 2/2000 | Cannon et al. ............. 379/142 |
| 6,064,725 A | * | 5/2000 | Nakanishi ................... 379/140 |
| 6,067,355 A | * | 5/2000 | Lim et al. .............. 379/142.14 |
| 6,118,859 A | * | 9/2000 | Giethoorn ................... 379/142 |

\* cited by examiner

*Primary Examiner*—Curtis Kuntz
*Assistant Examiner*—Barry W Taylor
(74) *Attorney, Agent, or Firm*—Jay H. Maioli (57) ABSTRACT

In an automatic answering mode operation, a caller ID detection circuit detects a caller ID that is given at the time of a call reception by a caller ID notification service that is provided by a telephone company. If reception history information having the same caller ID as the detected caller ID is stored in a reception history memory, the number of times of call reception in the reception history information is incremented by one. If no reception history information having the same caller ID as the detected caller ID is stored in the reception history memory, new reception history information having the detected caller ID is generated and additionally stored in the reception history memory. A caller ID and the number of times of call reception are displayed on an LCD based on the reception history information stored in the reception history memory.

4 Claims, 8 Drawing Sheets

RECEPTION HISTORY MEMORY

| CALLER'S TELEPHONE NO. | RECEPTION TIME | RECEPTION COUNTER | CALL CONTENT FLAG |
|---|---|---|---|
| 03-○○○○-××××  | 1997. 10. 1 10:12 | 3 | 1 |
| 03-△△△△-□□□□ | 1997. 10. 1 15:15 | 1 | 0 |
| ⋮ | ⋮ | ⋮ | ⋮ |

FIG. 5

CALL CONTENT MEMORY

| CALLER'S TELEPHONE NO. | CALL CONTENT DATA |
|---|---|
| 03-○○○○-×××× | ･･･････････ |
|  |  |

TELEPHONE TERMINAL AND CALLER ID UTILIZATION METHOD

BACKGROUND OF THE INVENTION

The present invention relates to a telephone terminal and a caller ID utilization method in which a caller ID, of which the telephone terminal is notified at the time of a call reception, is captured and utilized.

A caller ID notification service in which a reception-side telephone terminal is notified of the telephone number (caller ID) of a calling-side telephone terminal at the time of a call reception is now being put into practical use as a service provided by a telephone company.

By virtue of the caller ID notification service, a reception-side user can recognize a caller ID before an off-hook manipulation by, for example, having it displayed on an LCD (liquid crystal display) of his own telephone terminal.

By checking a caller ID, a user can not only respond, at ease, to a call from a person such as his friend or acquaintance who calls the user frequently but also prevent effectively a prank call, a persistent solicitation call, or the like.

By the way, it is conceivable to not only display, on an LCD of a telephone terminal, a caller ID that is given by the caller ID notification service, but also allow the caller ID to be captured to a memory of the telephone terminal and utilized thereafter, to thereby provide a telephone terminal that is easier to use. For example, while a reception-side telephone terminal is in an automatic answering mode, pieces of reception history information each consisting of a caller' number that is given by the caller ID notification service and corresponding reception time that is obtained from a timer of the telephone terminal may be stored in a memory in a cumulative manner.

In this case, even if a person who made a call (i.e., a caller) did not leave a message, a reception-side user can recognize the telephone number of the person who made the call and the time of the call based on the reception history information. Therefore, the reception-side user can call back.

However, even if a telephone terminal is so configured as to capture a caller ID that is given by the caller ID notification service, there may occur cases that a caller ID cannot be utilized in such a manner as to satisfy a user's requirement. For example, it is a common measure that when pieces of reception history information have been stored to such an extent as to fill up the storage capacity of a memory for storing reception history information, a new piece of reception history information is left by causing it to overwrite the oldest one. However, in this case, there may occur an event that a relatively old piece of reception history information that is necessary for the user of the telephone terminal is not stored in the memory of the telephone terminal.

Usually, the memory for storing reception history information is not required to store a large amount of reception history information. Therefore, it is not rational to use, for storage of reception history information, a large-capacity memory, which leads to an increase in the cost and size of a telephone terminal. With this understanding, for example, a memory having a storage capacity that allows storage of on the order of tens of pieces of reception history information is used as the memory for storing reception history information.

However, it is highly possible that the memory for storing reception history information becomes full soon in the case of a user who receives calls frequently or in a case where a telephone terminal operates in an automatic answering mode for several days because, for example, the user goes on a trip.

As described above, there may occur cases that a caller ID that is given by the caller ID notification service and captured to a telephone terminal cannot be utilized satisfactorily.

SUMMARY OF THE INVENTION

In view of the above problems in the art, an object of the present invention is therefore to provide a telephone terminal which enables more effective utilization of a caller ID that is given by the caller ID notification service as well as a caller ID utilization method which enables a telephone terminal to utilize a caller ID more effectively.

The invention provides a telephone terminal comprising caller ID detecting means for detecting a caller ID that is given at the time of a call reception in an automatic answering mode operation; a reception history memory for storing pieces of reception history information each correlating at least a caller ID detected by the caller ID detecting means and the number of times of reception of calls from a caller of the caller ID; reception history updating means for incrementing the number of times of call reception in a piece of reception history information already stored in the reception history memory if a caller ID detected this time by the caller ID detecting means coincides with a caller ID of the piece of reception history information, and for generating new reception history information having the caller ID detected this time by the caller ID detecting means and additionally storing it in the reception history memory if the caller ID detected this time by the caller ID detecting means does not coincide with the caller ID of the piece of reception history information; and display control means for performing a control so that one of the pieces of reception history information stored in the reception history memory is read out and displayed on a display device.

In this telephone terminal, when a plurality of calls have been received from the same caller, the number of times of call reception in reception history information having the caller ID of the caller is updated, to avoid an event that plural pieces of reception history information having the same caller ID exist in the call history memory. Therefore, more pieces of reception history information can be stored in the reception history memory and hence the reception history memory can be used more efficiently.

Since the number of times of call reception is counted for each caller ID, a caller ID and the number of times of call reception can easily be displayed on the display device of the telephone terminal so as to be correlated with each other. As a result, a user can recognize at a glance how many calls have been received from a particular caller without the need for searching for all pieces of reception history information.

DETAILED DESCRIPTION OF THE PREFERRED EMBODIMENT

A telephone terminal and a caller ID utilization method according to an embodiment of the present invention will be hereinafter described with reference to the accompanying drawings.

Figure 1:
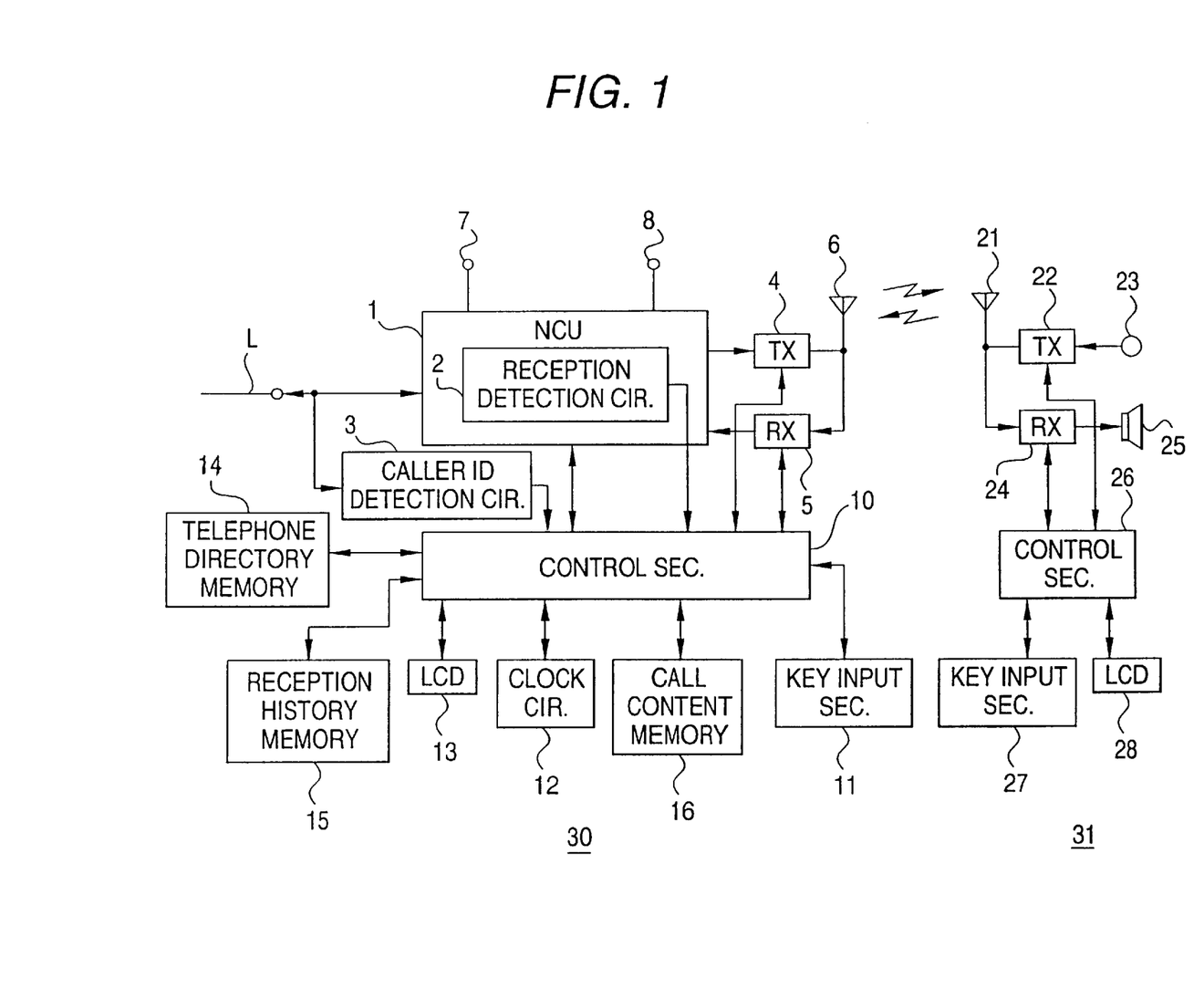
FIG. 1 is a block diagram showing a telephone terminal according to an embodiment of the present invention.
Figure 2:
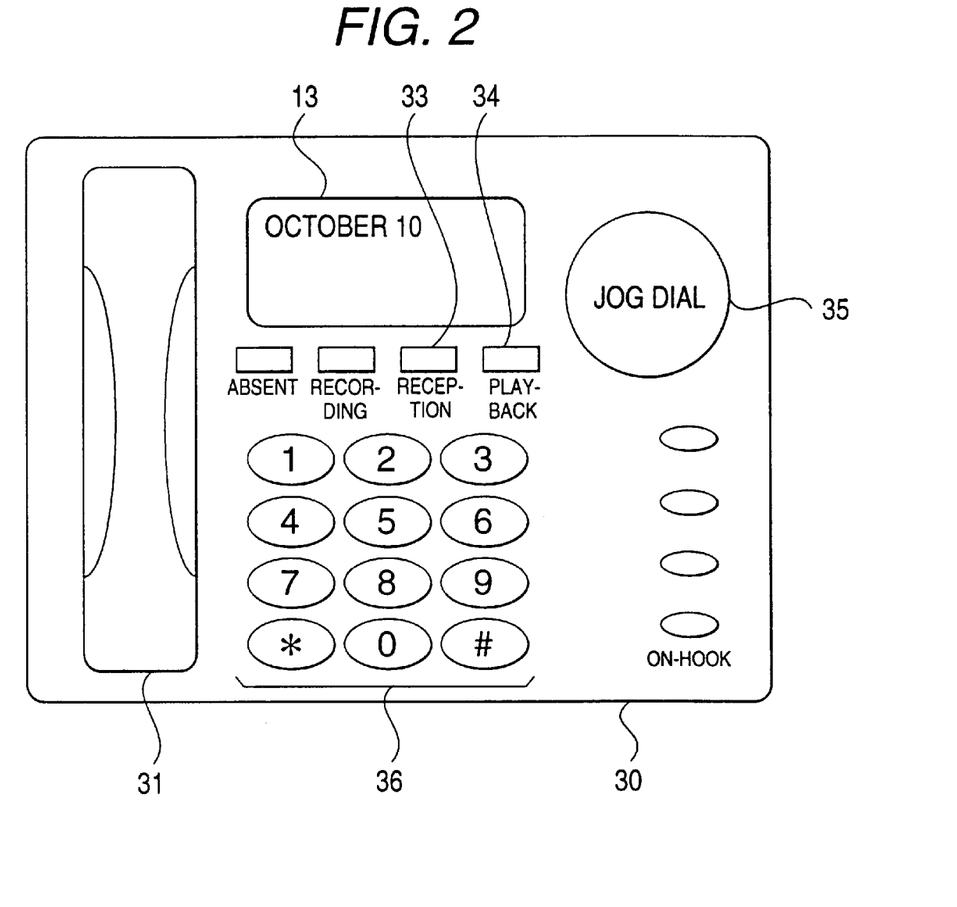
FIG. 2 shows an appearance of the telephone terminal of the embodiment.

FIG. 1 is a block diagram showing a telephone terminal according to the embodiment, and FIG. 2 shows an appearance of the telephone terminal according to the embodiment. This telephone terminal is a home-use telephone terminal having an automatic answering function that is used in a room and wire-connected to a telephone network. As shown in FIG. 1, the telephone terminal of the embodiment is composed of a telephone main body 30 to be connected to a telephone line L and a handset section 31 having a receiver and a transmitter. A voice signal can be exchanged wirelessly between the main body 30 and the handset section 31.

The main body 30 has an NCU (network control unit) 1, a caller ID detection circuit 3, a transmitting section 4 for transmitting a voice signal and a control signal to the handset section 31, a receiving section 5 for receiving a voice signal and a control signal from the handset section 31, and an antenna 6. A key input section 11, a clock circuit (timer) 12, an LCD (liquid crystal display) 13, a telephone directory memory 14, a reception history memory 15, and a call content memory 16 are connected to the main body 30. The main body 30 also has a control section 10 for controlling each section of the main body 30.

Although not shown in FIG. 1, the control section 10 is a microcomputer having a CPU, a ROM that stores programs and necessary data, a RAM that is used as, for example, a working area, and other components. Provided with a voice signal output terminal 7 and a voice signal input terminal 8, the NCU 1 can directly be connected to the handset section 31.

The handset section 31 has a transmitting section 22 for transmitting a voice signal and a control signal to the main body 30, a transmitter (microphone) 23, a receiving section 24 for receiving a voice signal and a control signal from the main body 30, a receiver (speaker) 25, a control section 26, a key input section 27, and an LCD 28. The control section 26, which controls each section of the handset section 31, is a microcomputer like the control section 10 of the main body 30.

Provided with an on-hook/off-hook key, a dial key, etc. in the key input section 27 of the handset section 31, the handset section 31 allows a user to make a call or respond to an incoming call via the main body 30 even when the handset section 31 is distant from the main body 30. The LCD 28 of the handset section 31 can display various kinds of information such as a warning message to a user.

In this embodiment, the NCU 1 and the caller ID detection circuit 3 of the main body 30 are connected to the telephone line L of a telephone network. The NCU 1 of the main body 30 has a reception detection circuit 2 as shown in FIG. 1 as well as an off-hook/on-hook switch, a dialer, etc. (not shown), and performs a telephone line connection control.

For example, at the time of a call reception, the NCU 1 informs the control section 10 of the call reception upon its detection by the reception detection circuit 2. In response, the control section 10 informs, for example, by ringing a bell, the user of the telephone terminal concerned that the call reception has occurred. When the user has performed an off-hook manipulation, the NCU 1 establishes a call-enabled state to allow the user to speak to the caller. When an on-hook manipulation has been performed thereafter, the NCU 1 terminates the call-enabled state and opens the telephone circuit.

The telephone terminal of this embodiment has an automatic answering function. If the reception detection circuit 2 of the NCU 1 detects a call reception in a state that an automatic answering mode is set, the control section 10 is informed of the call reception. The control section 10 controls the NCU 1 so as to make a connection to the telephone circuit automatically. Then, the control section 10 causes a message to the effect that the user is absent to be transmitted to the caller, and causes a call content message that is transmitted from the caller to be received and stored in the call content memory 16. This allows the user to listen to the message from the caller by reproducing it.

At the time of a transmission, if the user performs an off-hook manipulation and then manipulates dial keys of, for example, the key input section 11, the NCU 1 performs operations to make a telephone circuit connection to the destination terminal, such as generating a signal corresponding to the dial key manipulation to call the destination terminal and transmitting that signal.

A voice signal that has been transmitted from the other party via the telephone circuit to which the connection has been established by the NCU 1 is transmitted to the handset section 31 from the transmitting section 4 of the main body 30 via the antenna 6.

The voice signal from the other party that has been transmitted from the main body 30 is received by the receiving section 24 of the handset section 31 via the antenna 21 and supplied to the receiver (speaker) 25. As a result, a voice corresponding to the voice signal transmitted from the other party via the established telephone circuit is emitted from the receiver (speaker) 25 of the handset section 31.

On the other hand, a voice signal corresponding to a voice that has been picked up by the transmitter 23 of the handset section 31 is supplied to the transmitting section 22 of the handset section 31. The transmitting section 22 of the handset section 31 transmits the received voice signal to the main body 30 via the antenna 21.

The voice signal that has been transmitted from the handset section 31 is received by the receiving section 5 of the main body 30 via the antenna 6. Then, the receiving section 5 of the main body 30 transmits, via the NCU 1, the received voice signal to the telephone circuit to which the connection has been established by the NCU 1. In this manner, the voice of the user of the telephone terminal concerned is transmitted to the other party via the telephone circuit.

The caller ID detection circuit 3 detects a caller's telephone number called a caller ID that is given at the time of a call reception by the caller ID notification service which is a service provided by a telephone company. The detected caller ID is supplied to the control section 10.

The control section 10 displays the caller ID that is supplied from the caller ID detection circuit 3 on the LCD 13 before the user of the telephone terminal performs an off-hook manipulation. This operation allows the user to perform an off-hook manipulation after checking the caller ID. Therefore, the user can not only respond, at ease, to a call from a person, such as his friend, who calls the user frequently but also prevent effectively a prank call, a persistent solicitation call, or the like.

In this embodiment, as shown in FIG. 2, the key input section 11 of the main body 30 has various manipulation keys for allowing input of an instruction from the user, such as a reception key 33, a playback key 34, a jog dial key 35, and dial keys (ten keys) 36. The jog dial key 35 has two functions, that is, functions of a rotary key and a push button key. An operation of selecting an item from, for example, a menu can be performed by rotating the jog dial key serving as a rotary key. Depression of the jog dial key 35 serving as a push button key is regarded as a decision input for a selected item.

The clock circuit 12 not only provides the present time but also has a calendar function and hence can perform date management. As shown in FIG. 2, the LCD 13 has a relatively large display screen that can display various kinds of information such as the date and time and a caller ID.

Figure 3:
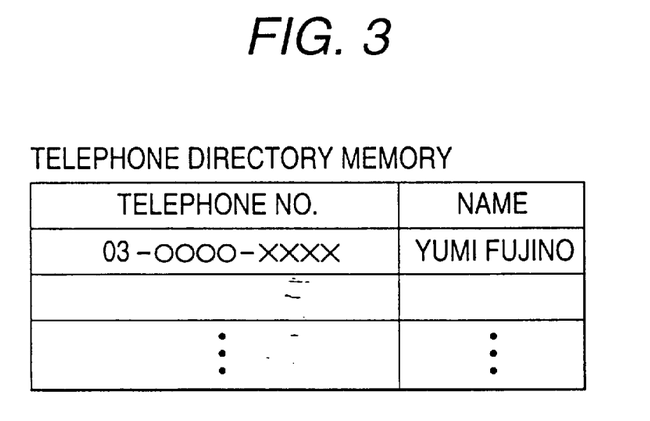
FIG. 3 shows information stored in a telephone directory memory of the telephone terminal of the embodiment.
Figure 4:
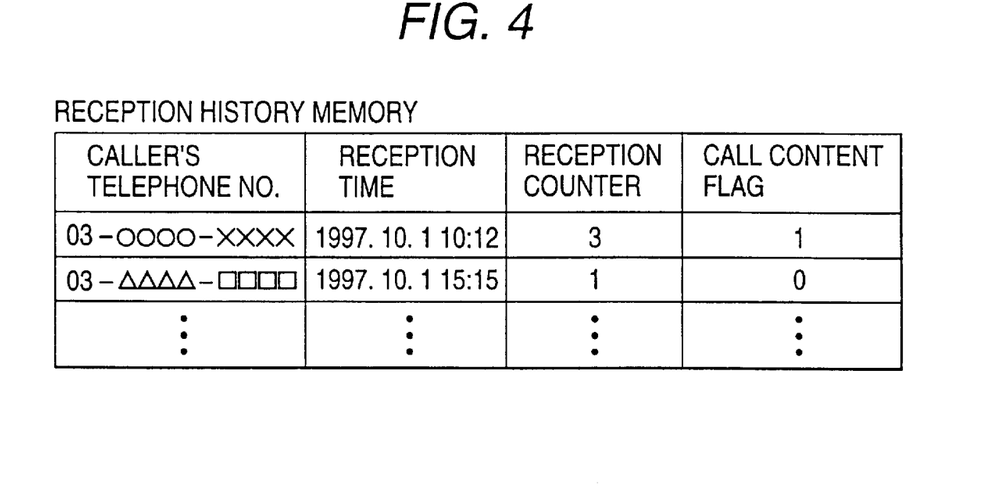
FIG. 4 shows information stored in a reception history memory of the telephone terminal of the embodiment.
Figure 5:
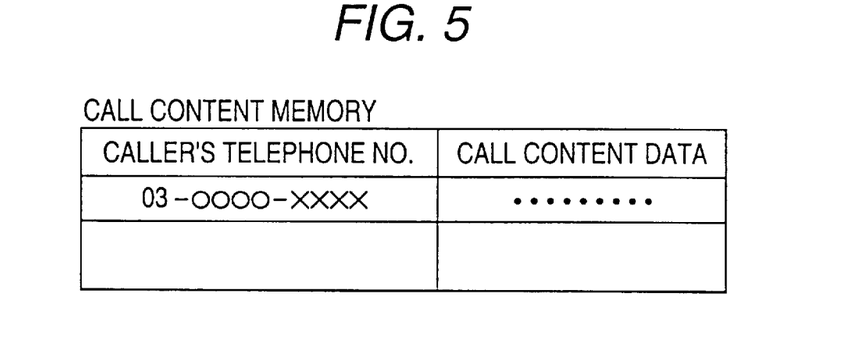
FIG. 5 shows information stored in a call content memory of the telephone terminal of the embodiment.

The main body 30 is also provided with the telephone directory memory 14, the reception history memory 15, and the call content memory 16, which are illustrated in FIGS. 3–5, respectively.

As shown in FIG. 3, the telephone directory memory 14 can store plural pieces of telephone directory information each correlating the telephone number of a person or party who calls the user frequently or the user calls frequently with his or its name. The telephone directory information stored in the telephone directory memory 14 can be used in making a telephone call, for example.

For example, in making a telephone call from the telephone terminal of this embodiment, a piece of telephone directory information stored in the telephone directory memory 14 is displayed on the LCD 13 upon depression of the jog dial key 35. The user tries to find the telephone directory information of a person to call by sequentially displaying pieces of telephone directory information stored in the telephone directory memory 14 by rotating the jog dial key 35. The user makes a decision by depressing the jog dial key 35 in a state that the telephone directory information of the intended person is displayed, whereupon automatic dialing is effected based on the thus-decided telephone directory information. That is, it is possible to call, without manipulating the dial keys 36, a person whose information is stored in the telephone directory memory 14.

As shown in FIG. 4, the reception history memory 15 can store plural pieces of reception history information each consisting of a caller ID (serving as an index) that is detected by the caller ID detection circuit 3 at a call reception in an automatic answering mode operation, call reception time that is acquired from the clock circuit 12, the number of times of call reception, and a call content flag that indicates presence/absence of a call content message. In this embodiment, as shown in FIG. 4, "1" is written to the call content flag when a call content message has been left and "0" is written to it when no call content message has been left. In this embodiment, the reception history memory 15 can store 20 pieces of reception history information.

In this embodiment, as shown in FIG. 4, each reception history information has a column for the number of times of call reception. When plural times of call reception occur in connection with the same caller ID, reception history information is not generated for each new call reception and, instead, the number of times of call reception in the reception history information of that caller ID is incremented. In this case, the reception time is updated to the reception time of the latest call of the caller ID concerned. When a call content message is left for the first time in connection with the caller ID concerned, a rewrite from "0" to "1" is effected in the call content flag.

If no reception history information of the same caller ID as that of a newly received call is stored, reception history information having a newly detected caller ID as an index is generated and additionally stored in the reception history memory 15. In this case, time acquired from the clock circuit 12 at the time of reception of a call that is associated with the caller ID concerned is written to the reception time column and the number "1" meaning the first call reception is written to the column for the number of times of call reception. The number "1" is written to the call content flag when a call content message has been left, and "0" is written to it when no call content message has been left. Reception history information that has been generated in this manner is additionally stored in the reception history memory 15.

As described above, in this embodiment, the measure is taken to avoid an event that plural pieces of reception history information relating to the same caller ID are stored in the reception history memory 15. That is, received calls associated with the same caller ID are handled together by incrementing the number of times of call reception and it is avoided that reception history information is generated for each call reception. Therefore, the storage capacity of the reception history memory 15 is not wasted, that is, it can be utilized effectively.

As shown in FIG. 5, when a caller has left a call content message in a state that the telephone terminal of the embodiment is in an automatic answering mode, call content information that correlates a caller ID (index) detected by the caller ID detection circuit 3 with the call content message is stored in the call content memory 16.

In this embodiment, call content information is additionally stored in the call content memory 16 and is not erased from it as long as the user of the telephone terminal does not perform an erasing manipulation.

The information stored in the telephone directory memory 14, the reception history memory 15, and the call content memory 16 of the embodiment is utilized in the following manner.

Figure 6:
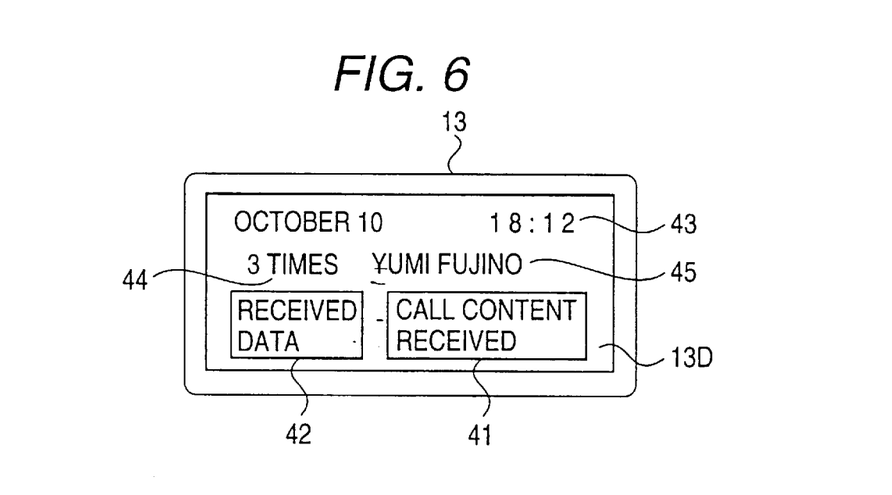
FIG. 6 shows an example of reception history information displayed on a display device of the telephone terminal of the embodiment.

For example, as shown in FIG. 6, apiece of reception history information can be displayed on the LCD 13 in such a manner as to be easily understood by the user by using the reception history information stored in the reception history memory 15 and telephone directory information stored in the telephone directory memory 14.

FIG. 6 shows an example of reception history information displayed on a display screen 13D of the LCD 13 when the user, who went out after setting an automatic answering mode in the telephone terminal and has returned home, depresses the reception key 33 to check the reception history information.

In this embodiment, as also described later, upon depression of the reception key 33, the latest piece of reception history information is read out from the reception history memory 15 and displayed on the LCD 13. In this case, call content presence/absence information 41 indicating whether a call content message corresponding to the reception history information being displayed is left in the call content memory 16 is displayed at a bottom portion of the display screen 13D of the LCD 13 in accordance with the call content flag of the reception history information. Type information 42 indicating the type of the information currently displayed is also displayed at a bottom portion of the display screen 13D.

The number of times of call reception 44 that has been obtained from the reception history information concerned and a caller name 45 corresponding to the caller ID of the reception history information concerned that has been read out from the telephone directory memory 14 by using the caller ID as a read key are displayed at central portions of the display screen 13D of the LCD 13. Further, call reception time 43 that has been obtained from the reception history information concerned and today's date that has been obtained from the clock circuit 12 are displayed at top portions of the display screen 13D of the LCD 13.

By giving a glance at the display screen 13D, the user can recognize how many calls were received from the caller concerned, when the latest call was received, and whether a call content message is left.

In this state, by rotating the jog dial key 35, other pieces of reception history information stored in the reception history memory 15 can be displayed in a similar manner. If there is no telephone directory information corresponding to the caller ID of the reception history information concerned, the caller ID of the reception history information is displayed as it is because a caller name cannot be displayed.

When the playback key 34 is depressed in a state that the contents of a piece of reception history information stored in the reception history memory 15 are displayed, all pieces of call content information having the same caller ID as the reception history information concerned are read out from the call content memory 16 and reproduced consecutively. Therefore, where the telephone terminal of the embodiment is so configured that the call content memory 16 stores a plurality of call content messages from the same caller, the user can hear all of the call content messages from the same caller consecutively.

As described above, in the telephone terminal of the embodiment, a caller ID that is detected at a call reception in an automatic answering mode is stored as part of reception history information and a call content message of a caller that is received in an automatic answering mode is stored so as to be correlated with a caller ID, whereby a caller ID that is given at the time of a call reception is captured and utilized effectively as exemplified by improvement of the automatic answering function.

Next, the operation of the telephone terminal of the embodiment will be described with reference to flowcharts of FIGS. 7–11.

First, a description will be made of a process of generating reception history information and call content information and storing those in the reception history memory 15 and the call content memory 16, respectively, in an automatic answering mode operation.

Figure 7:
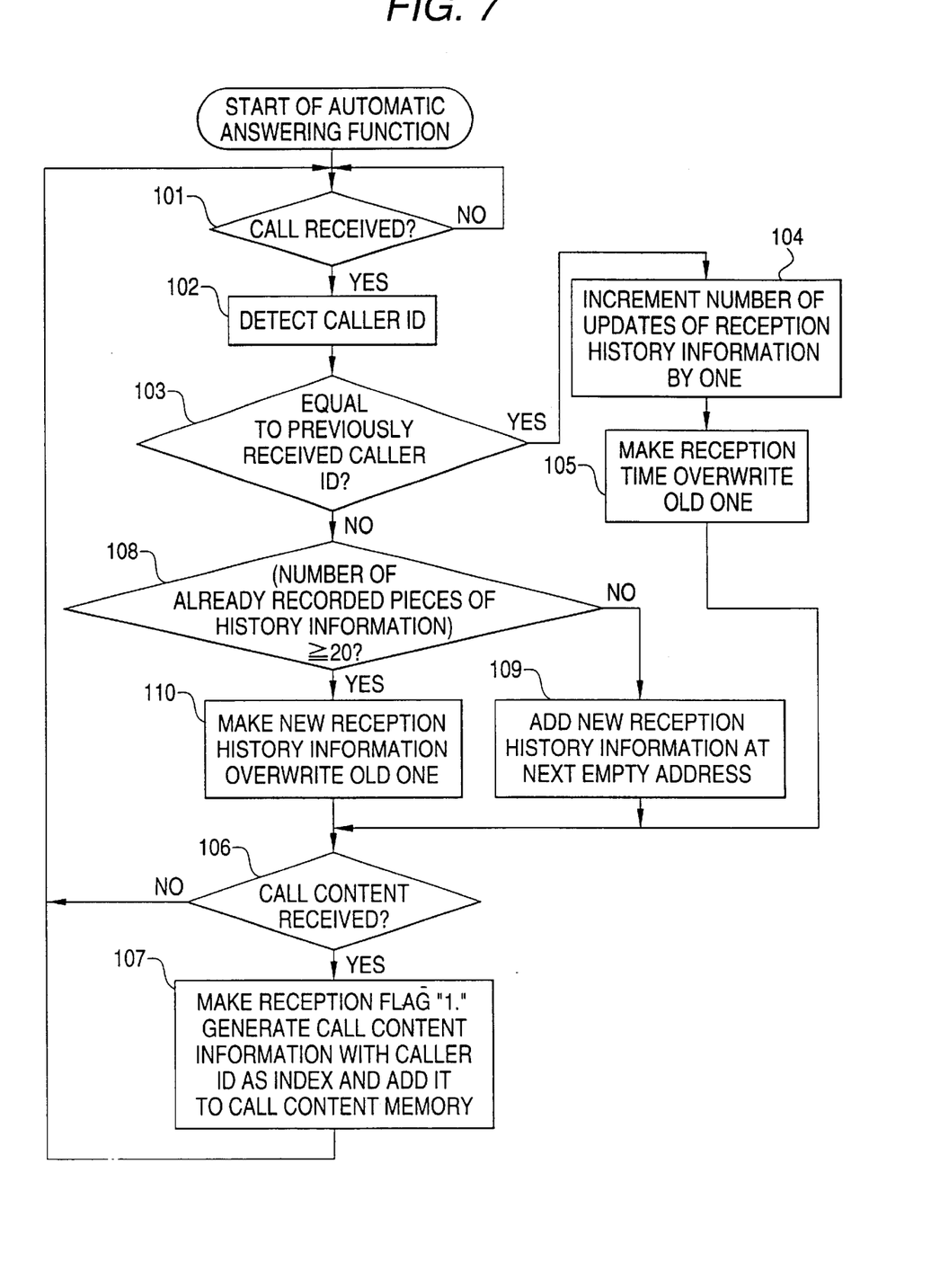
FIG. 7 is a flowchart showing a process that is executed in an automatic answering mode in the telephone terminal of the embodiment.

When an automatic answering mode key (not shown) that is provided in, for example, the key input section 11 of the main body 30 of the telephone terminal of the embodiment is depressed, an automatic answering mode is established in the telephone terminal and a process shown in FIG. 7 is executed.

If a call reception is detected by the reception detection circuit 2 of the NCU 1 (step 101) after an automatic answering mode has been established in the telephone terminal of the embodiment, the control section 10 is informed of the call reception and supplied with a caller ID that is detected by the caller ID detection circuit 3 (step 102).

Referring to the reception history information stored in the reception history memory 15, the control section 10 judges whether reception history information having the same caller ID as the caller ID just supplied from the caller ID detection section 3 exists in the reception history memory 15 (step 103). If the judgment result at step 103 is affirmative, the control section 10 increments the number of times of call reception of the reception history information concerned by one (step 104). Further, the control section 10 acquires the present time from the clock circuit 12 and causes the present time to overwrite the time at the call reception time column of the reception history information concerned (step 105).

If the judgment result at step 103 is negative (i.e., there is no reception history information having the same caller ID as the caller ID supplied from the caller ID detection circuit 3), the control section 10 judges whether 20 pieces of reception history information, which fill up the storage capacity of the reception history memory 15, are stored (step 108). If the judgment result is negative, the control section 10 additionally stores, in the reception history memory 15, reception history information including the caller ID that was detected this time by the caller ID detection circuit 3 and call reception time that is acquired from the clock circuit 12 (step 109).

If the judgment result at step 108 is affirmative (i.e., 20 pieces of reception history information are stored in the reception history memory 15), as described later, the control section 10 selects a piece of reception history information that is relatively low in importance such as one that is not correlated with any of the call content information stored in the call content memory 16, and causes the caller ID that was detected this time by the caller ID detection circuit 3 and call reception time that is acquired from the clock circuit 12 to overwrite the corresponding data in the selected reception history information and also causes "0" to overwrite the data of the call reception flag in the selected reception history information (step 110).

After completion of step 105, 109, or 110, the control section 10 executes a judgment step 106. That is, after completion of the steps for updating the number of times of call reception and other information of the reception history information having the caller ID that was detected this time by the caller ID detection circuit 3 (steps 104 and 105) or the steps for additionally storing reception history information for the caller ID that was detected this time by the caller ID detection circuit 3 (step 109 or 110), the control section 10 judges whether the caller transmitted a call content message (step 106).

If the judgment result at step 106 is affirmative, the control section 10 sets "1" in the call content flag in the reception history information whose number of times of call reception and other information have been updated this time or that has been additionally (i.e., newly) stored this time. Further, the control section 10 generates call content information that correlates the caller ID (index) that was detected by the caller ID detection circuit 3 with the call content message and additionally stores it in the call content memory 16 (step 107).

If the judgment result at step 106 is negative (i.e., no call content message was transmitted), or when the updating of the call reception flag of the reception history information and the additional storage of call content information (step 107) have completed, the telephone terminal is rendered in a state of waiting for a call reception and thereafter step 101 and the following steps are repeated.

Figure 8:
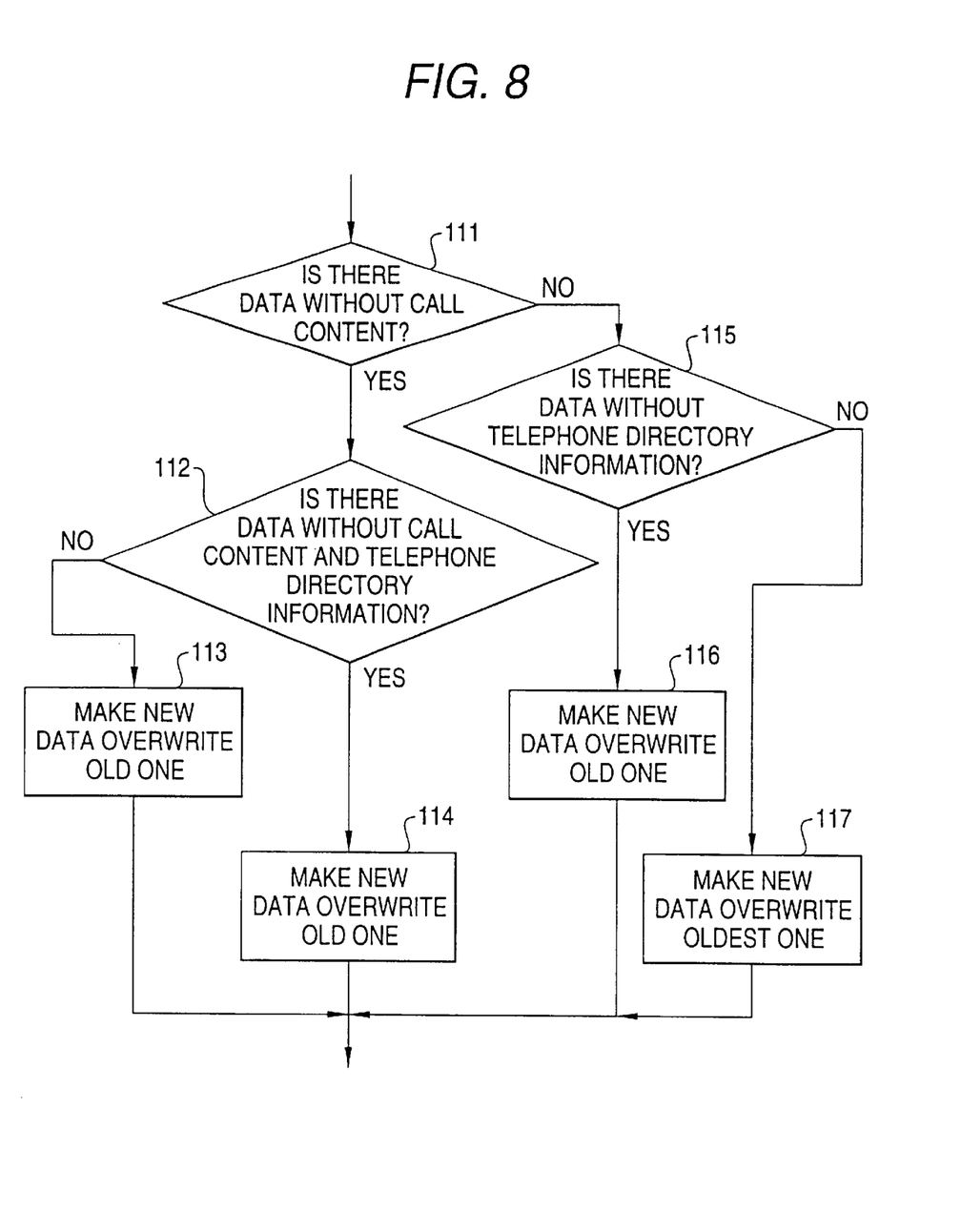
FIG. 8 is a flowchart showing a reception history information overwriting process that is created in an automatic answering mode in the telephone terminal of the embodiment.

FIG. 8 is a flowchart showing the details of the reception history information overwriting process (step 110 in FIG. 7).

If it is judged at the judgment step 108 in the automatic answering mode process shown in FIG. 7 that 20 pieces of reception history information, which fill up the storage capacity of the reception history memory 15, are stored, the process shown in FIG. 8 is executed at step 110.

In the process of step 110, first, the control section 10 judges whether the reception history information stored in the reception history memory 15 includes a piece that is not associated with any call content data, that is, a piece that is not associated with any call content information having, as an index, the same caller ID as the caller ID that was detected by the caller ID detection circuit 3 this time (step 111).

If the judgment result at step 111 is affirmative, the control section 10 judges whether the reception history information associated with no call content information having the same caller ID as an index includes a piece that is not associated with any telephone directory information having the same caller ID in the telephone directory memory 14 (step 112).

If the judgment result at step 112 is negative, the control section 10 causes the caller ID that was detected by the caller ID detection circuit 3 this time and call reception time that is acquired from the clock circuit 12 to overwrite the corresponding data in the oldest one of the pieces of reception history information found at step 111 that is not associated with any content information having the same caller ID, and causes "0" to overwrite the data of the call content flag of the oldest reception history information (step 113).

If the judgment result at step 112 is affirmative (i.e., there exists a piece of reception history information that is not associated with any telephone directory information having the same caller ID in the telephone directory memory 14), the control section 10 causes the caller ID detected this time and call reception time to overwrite the corresponding data in the oldest one of the pieces of reception history information that is not associated with any telephone directory information having the same caller ID in the telephone directory memory 14, and causes "0" to overwrite the data of the call content flag in the oldest reception history information (step 114), as in the case of step 113.

If the judgment result at step 111 is negative (i.e., there is no reception history information that is not associated with any call content information having the same caller ID as an index), the control section 10 judges whether the reception history information stored in the reception history memory 15 includes a piece that is not associated with any telephone directory information having the same caller ID in the telephone directory memory 14 (step 115).

If the judgment result at step 115 is affirmative, the control section 10 causes the caller ID detected this time and call reception time to overwrite the corresponding data in the oldest one of the pieces of reception history information that is not associated with any telephone directory information having the same caller ID in the telephone directory memory 14, and causes "0" to overwrite the data of the call content flag in the oldest reception history information (step 116), as in the case of step 113.

If the judgment result at step 115 is negative (i.e., there is no reception history information that is not associated with any telephone directory information having the same caller ID in the telephone directory memory 14), the control section 10 causes the caller ID detected this time and call reception time to overwrite the corresponding data in the oldest one of the pieces of reception history information stored in the reception history memory 15, and causes "0" to overwrite the data of the call content flag in the oldest reception history information (step 117), as in the case of step 113.

As described above, if 20 pieces of reception history information are already stored in the reception history memory 15, a piece of reception history information having neither corresponding call content information nor corresponding telephone directory information is regarded as lowest in importance and subjected to overwriting of new reception history information with priority.

A piece of reception history information that does not have any corresponding call content information or does not have any corresponding telephone directory information is regarded as second lowest in importance and subjected to overwriting of new reception history information when there exists no reception history information having neither a corresponding call content information nor a corresponding telephone directory information.

If all pieces of reception history information have corresponding call content information and telephone directory information, the oldest one among all pieces of reception history information is subjected to overwriting of new reception history information.

That is, in a state that pieces of reception history information are written to the reception history memory 15 in such a number as to fill up its storage capacity, new reception history information is caused, with priority, to overwrite a piece of reception history information, among the pieces of reception history information stored in the reception history memory 15, that have neither corresponding call content information nor corresponding telephone directory information and hence is low in importance rather than the mere oldest reception history information. This measure allows pieces of reception history information having corresponding call content information and/or telephone directory information and which hence are relatively high in importance to be left in the reception history memory 15 to the end of the process and prevents erasure of pieces of reception history information that are high in importance and required by the user.

As described above in connection with the flowcharts of FIGS. 7 and 8, in the telephone terminal of the embodiment, when calls from the same caller occur plural times, the number of times of call reception and the call reception time in the reception history information are updated and it is avoided that plural pieces of reception history information having the same caller ID are generated as in the case where reception history information is additionally stored for each call reception. This measure enables efficient utilization of the reception history memory 15 having a limited storage capacity.

Also when pieces of reception history information have been stored in the reception history memory 15 in such a number as to fill up its storage capacity, the reception history memory 15 can be used efficiently and it can be avoided that pieces of reception history information that are high in importance and required by the user are erased by overwriting of new reception history information, because pieces of reception history information that are low in importance are subjected to overwriting by new reception history information with priority.

When calls from the same caller occur plural times, the number of call reception in the reception history information having the caller ID of the caller concerned is updated. Therefore, the number of times of call reception that indicates the number of times of calls from the caller concerned can be displayed easily as shown in FIG. 6, which is very convenient.

Next, a description will be made of a process of utilizing the reception history information and the call content information that were stored in the reception history memory 15 and the call content memory 16, respectively, as described above in connection with the flowcharts of FIGS. 7 and 8 when call receptions occurred while the telephone terminal of the embodiment was in an automatic answering mode.

Figure 9:
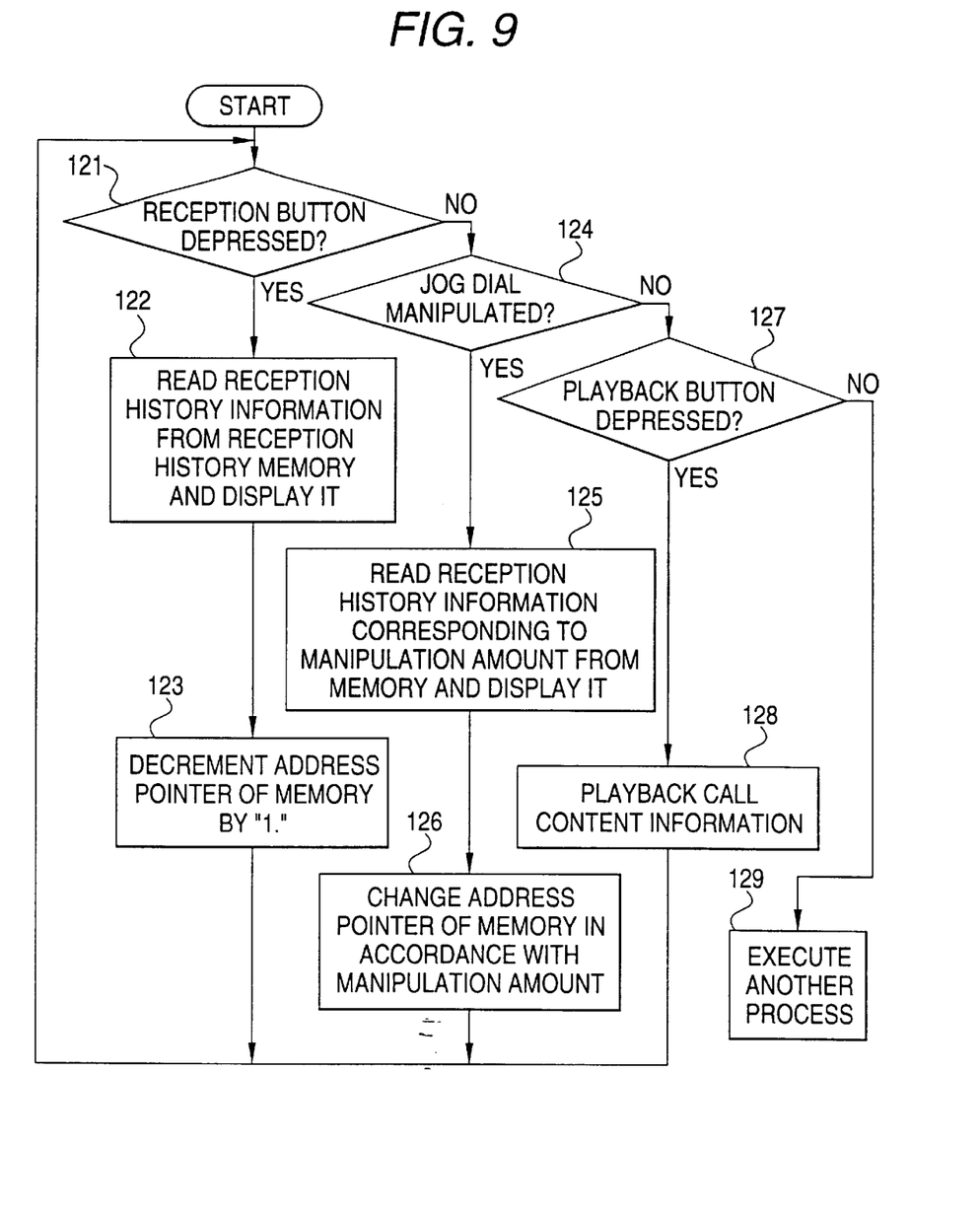
FIG. 9 is a flowchart showing a process that is executed in utilizing reception history information and call content information that were stored in the reception history memory and the call content memory, respectively, of the telephone terminal of the embodiment that was rendered in an automatic answering mode.

FIG. 9 is a flowchart showing a process that is executed in utilizing the reception history information and the call content information that were stored in the reception history memory 15 and the call content memory 16, respectively, of the telephone terminal of the embodiment that was rendered in an automatic answering mode.

When a call reception occurred while an automatic answering mode was set, a message indicating the occurrence of a call reception such as "Call reception occurred" or "Call was received" is displayed on the LCD 13 of the main body 30 of the telephone terminal of the embodiment.

If the message indicating the occurrence of a call reception is displayed, the user of the telephone terminal can display and see reception history information on the LCD 13 starting from the one corresponding to the last call reception by depressing the reception key 33 that is provided in the main body 30 of the telephone terminal.

Specifically, when the reception key 33 of the main body 30 has been depressed (step 121), the control section 10 reads out, from the reception history memory 15, the reception history information corresponding to the last call reception that occurred while the automatic answering mode is set and displays the number of times of call reception 44, the caller name 45, etc. on the LCD 13 (step 122). Then, the control section 10 decrements the address pointer of the reception history memory 15 by one so that it point to the immediately preceding reception history information (step 123), and thereafter executes step 121 and the following steps repeatedly.

When the jog dial key 35 has been rotated (step 124) after the depression of the reception key 33 and the display of reception history information, the control section 10 reads out reception history information stored at a position of the reception history memory 15 corresponding to the manipulation amount of the jog dial key 35 and displays the contents of the read-out reception history information on the LCD 13 (step 125). Then, the control section 10 changes the address pointer of the reception history memory 15 in accordance with the manipulation amount of the jog dial key 35 (step 126) and thereafter executes step 121 and the following steps repeatedly.

If the playback key 34 of the main body 30 is depressed (step 127) in a state that reception history information of caller intended by the user is displayed on the LCD 13 as a result of manipulations on the reception key 33 and the jog dial key 35, the control section 10 reads out, from the call content memory 16, all pieces of call content information having the same caller ID as the caller ID of the reception history information that is currently displayed on the LCD 13 and reproduces those pieces of call content information consecutively in order of reception (step 128).

When a key other than the reception key 33, the playback key 34, and the jog dial key 35 has been manipulated, the control section 10 executes a process other than the above that corresponds to the manipulated key (step 129).

Figure 10:
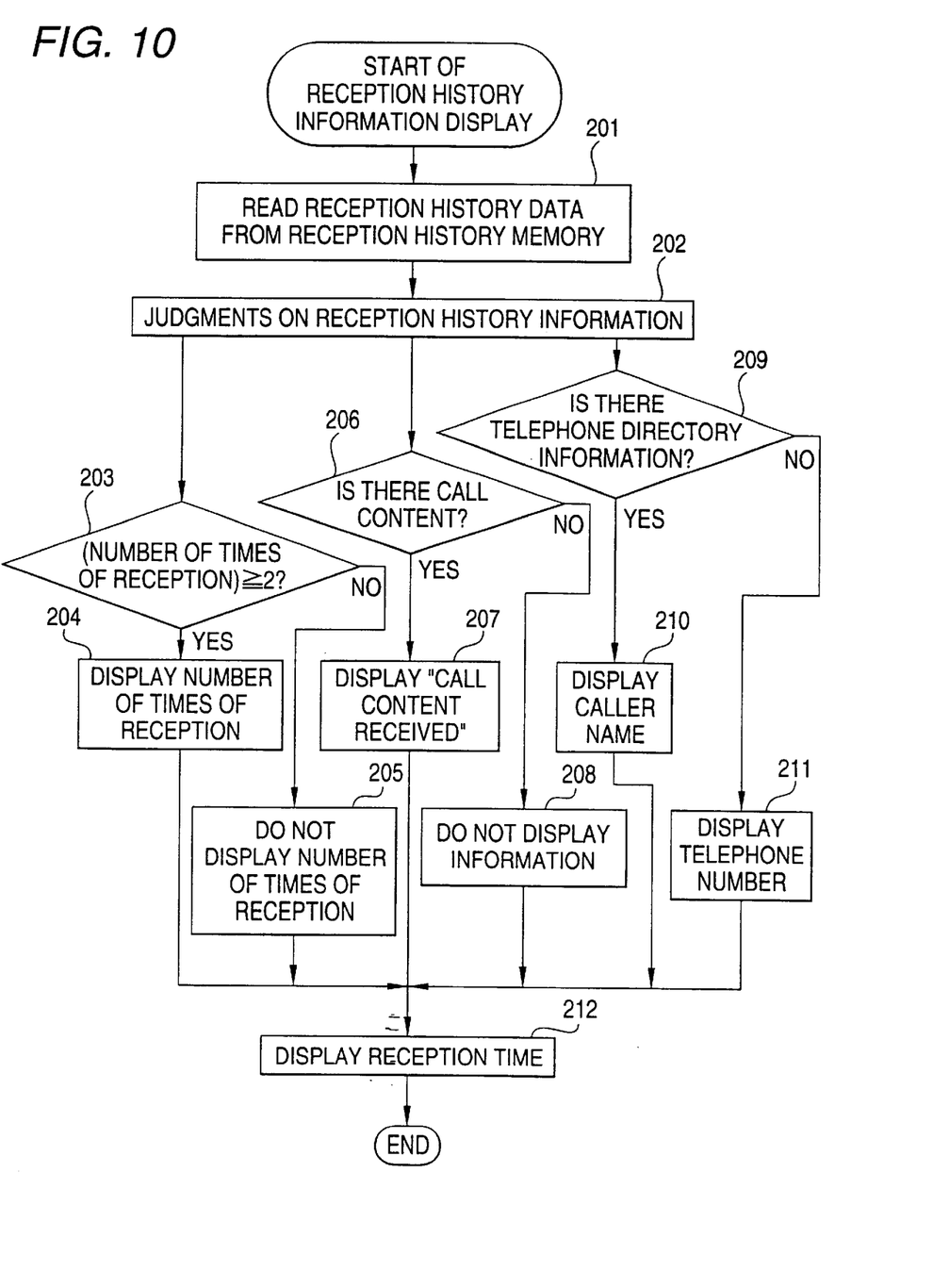
FIG. 10 is a flowchart showing a process of displaying reception history information that was stored in the telephone terminal of the embodiment that was rendered in an automatic answering mode.

FIG. 10 shows a flowchart showing the details of the process of displaying reception history information (step 122 or 125 in FIG. 9).

In the telephone terminal of the embodiment, as described above, the reception history information display process shown in FIG. 10 is executed at step 122 when the reception key 33 has been depressed or at step 125 when the jog dial key 35 has been rotated after depression of the reception key 33.

First, the control section 10 reads out the specified reception history information from the reception history memory 15 (step 201). That is, the control section 10 reads out, from the reception history memory 15, the reception history information corresponding to the last call reception in the automatic answering mode when the reception key 33 has been depressed, and the reception history information stored at a position corresponding to the manipulation amount of the jog dial key 35 when the jog dial key has been rotated after depression of the reception key 33.

Then, to determine information to be displayed, the control section 10 performs detailed judgments in the following manner (step 202). Specifically, the control section 10 judges whether the number of times of call reception of the read-out reception history information is two or more (step 203). If the judgment result at step 203 is affirmative, the control section 10 displays the number of times of call reception on the LCD 13 as the number of times of call reception 44 as shown in FIG. 6 (step 204). If the judgment result at step 202 is negative (i.e., the number of times of call reception is not two or more), the number of times of call reception is one and hence the control section 10 refrains from displaying it on the LCD 13 (step 205).

The control section 10 judges based on the call content flag whether there exists a call content (step 206). If the judgment result at step 206 is affirmative, the control section 10 effects display of "Call content received" 41 as shown in FIG. 6 (step 207). If the judgment result at step 206 is negative (i.e., there exists no call content), the control section 10 refrains from effecting display of "Call content received" 41 (step 208).

The control section 10 also judges whether telephone directory information having the same caller ID as the caller ID of the reception history information concerned is stored in the telephone directory memory 14 (step 209). If the judgment result at step 209 is affirmative, the control section 10 displays the caller name of the telephone directory information as the caller name 45 as shown in FIG. 6 (step 210). If the judgment result at step 209 is negative (i.e., no telephone directory information having the same caller ID is stored), the control section 10 displays the caller ID on the LCD 13 as information for identifying the caller (step 211).

Then, the control section 10 displays the call reception time of the reception history information on the LCD 13 as the call reception time 43 as shown in FIG. 6 (step 212).

Then, the reception history information display process of FIG. 10 is finished.

Figure 11:
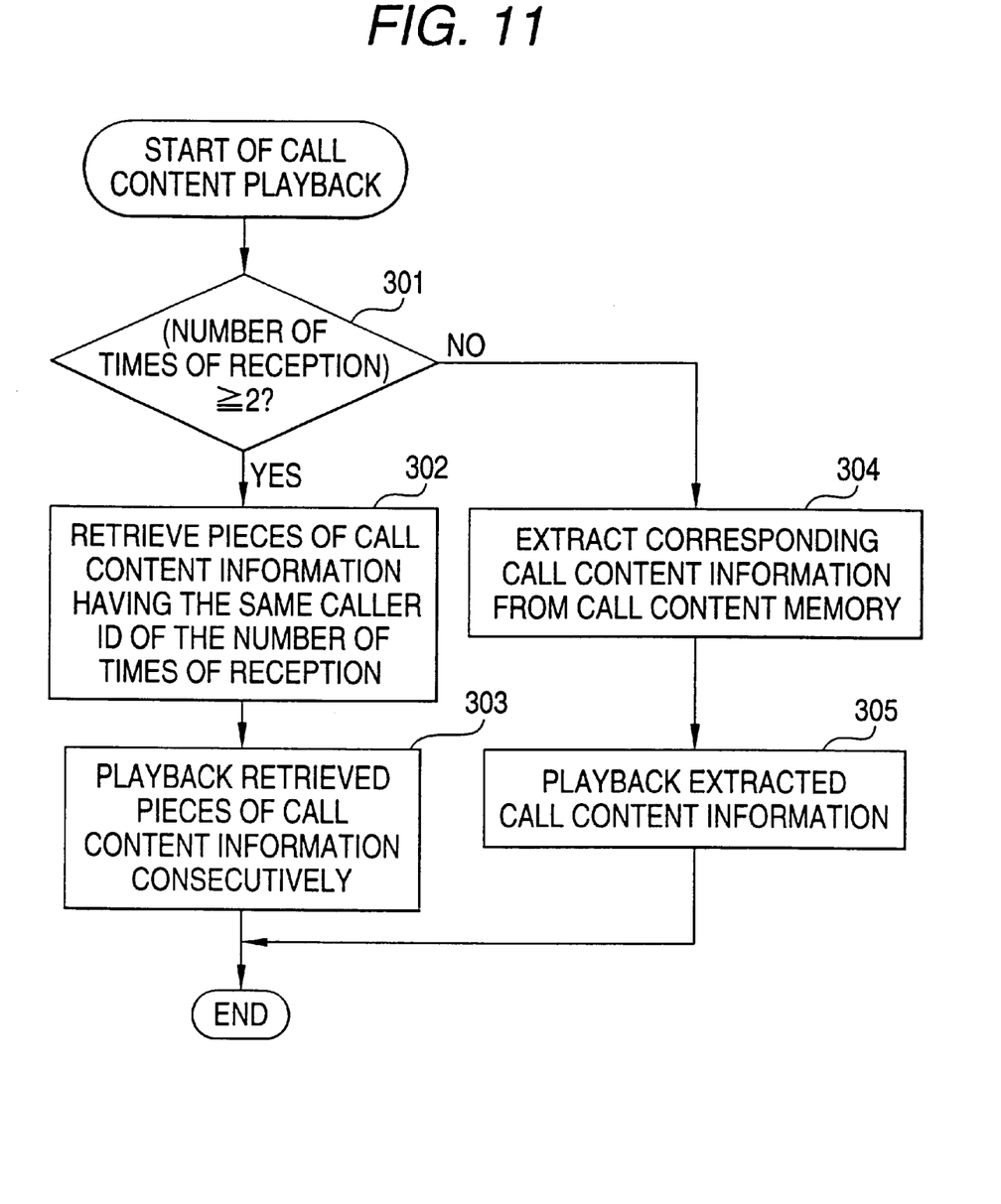
FIG. 11 a flowchart showing a process of reproducing call content information that was stored in the telephone terminal of the embodiment that was rendered in an automatic answering mode.

FIG. 11 is a flowchart showing the details of the call content information reproduction process (step 128 in FIG. 9).

In the telephone terminal of the embodiment, as described above, the call content information reproduction process of FIG. 11 is executed when the playback key 34 has been depressed in a state that reception history information is displayed.

First, the control section 10 judges whether the number of call receptions of the currently displayed reception history information is two or more (step 301). If the judgment result at step 301 is affirmative, the control section 10 retrieves, for the number of call, pieces of call content information having the same caller ID as the caller ID of the reception history information concerned (step 302). If the judgment result at step 301 is negative (i.e., the number of times of call reception of the reception history information concerned is not two or more), the control section 10 extracts the call content information having the same caller ID as the caller ID of the reception history information concerned from the call content memory 16 (step 304) and reproduces the extracted call content information (step 305).

As described above, in the telephone terminal of the embodiment, even in a case where there exist a plurality of call content messages from the same caller, it is not necessary to perform a playback manipulation for each of those call content messages. Further, even where pieces of call content information from a plurality of callers exist in mixed form, a plurality of call content messages from the same caller can be reproduced consecutively. Therefore, there does not occur a problem that the user cannot acquire an important call content because one of a plurality of call content messages is not reproduced, or that the user fails to hear a call content message from an intended caller because it is mixed with call content information from another caller.

As described above, when a plurality of calls have been received from the same caller, the number of times of those call reception is displayed. On the other hand, when only one call has been received from a certain caller, the number of times of call reception is not displayed. When the reception history information does not have corresponding call content information, display of "Call content received" is not effected. Therefore, the display of the LCD 13 does not become unduly illegible.

If telephone directory information having the same caller ID as the caller ID of the reception history information is stored in the telephone directory memory 14, the name in the telephone directory information is displayed on the LCD 13. Therefore, the user can clearly be informed of the caller name. If telephone directory information having the same caller ID as the caller ID of the reception history information is not stored in the telephone directory memory 14, the caller ID is displayed on the LCD 13 as information for identifying the caller. Therefore, there does not occur an event that the user is not informed who is the caller; the user can identify the caller reliably.

Although in the above embodiment reception history information and call content information are stored separately in the reception history memory and the call content memory, they may be stored in one memory, for example, in such a manner as to be stored in separate memory areas.

Also in this case, reception history information and call content information can be managed in the same manner as in the case of using two separate memories if it is avoided that plural pieces of reception history information exist for the same caller ID by updating the number of times of call reception and the call reception time when a plurality of calls with the same caller ID have been received, and if call content information is always stored additionally.

It goes without saying that it is possible to manage all of reception history information, call content information, and telephone directory information by using a single memory.

Although in the above embodiment each piece of call content information stored in the call content memory has a caller ID, the invention is not limited to such a case. Call content messages of the same caller ID may be stored in such a manner as to share the caller ID, in which case the call content memory can be used efficiently.

Although in the above embodiment reception history information, call content information, and telephone directory information are correlated with each other by a caller ID, the invention is not limited to such a case. If a management number such as a sequence number is given to each reception history information in addition storing it and the management number is also given to call content information corresponding to the reception history information, the reception history information and the call content information can be correlated with each other by the management number.

Although in the above embodiment plural pieces of call content information from the same caller are reproduced in order from the oldest one, they may be reproduced in the reverse order, that is, in order from the newest one.

If call content messages and caller IDs are stored so as to be correlated with each other, a plurality of call content messages from the same caller can be reproduced consecutively even without reception history information. That is, even in a telephone terminal that is not equipped with a display device such as an LCD, a plurality of call content messages from the same caller can be reproduced consecutively by storing call content messages and caller IDs so that they are correlated with each other.

What is claimed is:

1. A telephone terminal comprising:
   caller ID detecting means for detecting a caller ID provided at a time a call is received while said telephone terminal is in an automatic answering mode;
   a reception history memory for storing reception history information relating to each call received, said reception history information including said caller ID detected by said caller ID detecting means, a reception time of said call, and a number of times said caller ID has been received;
   reception history updating means for updating said reception history by incrementing said number of times said caller ID has been received and updating said reception time by overwriting a previously stored reception time in said reception history when said caller ID coincides with a previously received caller ID;
   control means for reading out said reception history information stored in said reception history memory and displaying said reception history information on a display device;
   a telephone directory memory for storing telephone directory information, said telephone directory information correlating a plurality of caller IDs with a plurality of caller names, wherein when said caller ID is about to be displayed on said display device said display control means displays a caller name stored in said telephone directory memory corresponding to said caller ID;

a call content memory for storing call content messages, each call content message correlated with said caller ID of said caller when said call content message is transmitted by said caller while said telephone terminal is in said automatic answering mode;

reception history erasing means controlled by said control means for automatically erasing, based on a determination of an importance of said reception history information, a particular reception history information from said reception history memory that is determined by said control means to be of low importance by not being correlated with any call content message stored in said call content memory when said reception history memory is determined by said control means to be full, and when said particular reception history information cannot be found by said control means an other reception history information that is neither correlated with any call content message stored in said call content memory nor correlated to any telephone directory information stored in said telephone directory is determined by said control means to be of medium importance and is erased, and when all pieces of reception history information have corresponding call content messages stored in said call content memory and corresponding telephone directory information stored in said telephone directory, an oldest reception history information is determined by said control means to be of high importance and is erased; and call content reproducing means controlled by said control means for automatically consecutively reproducing all call content messages stored in said call content memory correlated to said caller ID when said telephone terminal is instructed to reproduce call content messages stored in said call content memory correlated to said caller ID.

2. The telephone terminal according to claim 1, wherein when a new call content message is received having said previously received caller ID said new call content message is stored in said call content memory in such a way as to be added to a previously stored call content message corresponding to said previously received caller ID.

3. A caller ID utilization method comprising:

detecting a caller ID provided at a time a call is received while a telephone terminal is in an automatic answering mode;

storing reception history information in a reception history memory relating to each call received, said reception history information including said caller ID, a reception time of said call, and a number of times said caller ID has been received;

updating said reception history by incrementing said number of times said caller ID has been received and updating said reception time by overwriting a previously stored reception time in said reception history when said caller ID coincides with a previously received caller ID;

reading out said reception history information and displaying said reception history information on a display device;

storing telephone directory information in a telephone directory memory, said telephone directory information correlating a plurality of caller IDs with a plurality of caller names, wherein when said caller ID is about to be displayed on said display device a caller name corresponding to said caller ID is displayed;

storing call content messages in a call content memory, each call content message correlated with said caller ID of said caller when said call content message is transmitted by said caller while said telephone terminal is in said automatic answering mode; and automatically erasing, based on a determination of an importance of said reception history information, a particular reception history information from said reception history memory that is determined to be of low importance by not being correlated with any stored call content message when it is determined there is no more space to store said reception history, and when said particular reception history information cannot be found an other reception history information that is neither correlated with any call content message stored in said call content memory nor correlated to any telephone directory information stored in said telephone directory memory is determined to be of medium importance and is erased, and when all pieces of reception history information have corresponding call content messages stored in said call content memory and corresponding telephone directory information stored in said telephone directory, an oldest reception history information is determined to be of high importance and is erased; and automatically consecutively reproducing all call content messages stored in said call content memory correlated to said caller ID when said telephone terminal is instructed to reproduce call content messages stored in said call content memory correlated to said caller ID.

4. The caller ID utilization method according to claim 3, wherein when a new call content message is received having said previously received caller ID said new call content message is stored in such a way as to be added to a previously stored call content message corresponding to said previously received caller ID.

* * * * *